March 3, 1953 — M. BUTTS — 2,630,011

MOTOR VEHICLE OIL LEVEL INDICATOR

Filed June 1, 1951

INVENTOR.

Maurice Butts

BY Victor J. Evans & Co.

ATTORNEYS

Patented Mar. 3, 1953

2,630,011

UNITED STATES PATENT OFFICE 2,630,011

MOTOR VEHICLE OIL LEVEL INDICATOR

Maurice Butts, Thayer, Iowa

Application June 1, 1951, Serial No. 229,350

4 Claims. (Cl. 73—316)

This invention relates to devices for indicating the oil level in motor vehicle engine crank cases on the instrument board of the vehicle, and in particular a pair of cylinders, one of which is positioned adjacent the instrument board of the vehicle and the other positioned over an auxiliary cylinder connected to and positioned at one side of the crank case and a pump for supplying oil through a valve to the cylinder at the crank case for elevating a piston in the cylinder and a magnetically actuated pointer operated by a float having a magnet thereon and positioned in the cylinder adjacent the instrument panel whereby upon release of pressure the piston of the cylinder positioned at the crank case drops downwardly until the piston rod engages a float in the auxiliary cylinder when it is desired to show the oil level.

The purpose of this invention is to provide a manually actuated oil indicating device in which electrical connections are eliminated and the parts are directly actuated by oil in the crank case of an engine to indicate the oil level in the crank case.

Various types of oil indicating devices have been provided for showing the level of the oil at the instrument panel but where oil flows through the devices continuously leaks develop in the connections and the accuracy of the device is not dependable. With this thought in mind this invention contemplates an oil level indicating device wherein oil level is indicated at the instrument panel with the indicating elements controlled through the combination of a piston in one cylinder with a float in an auxiliary cylinder, the oil level in the auxiliary cylinder being the same as that of the oil in the crank case.

The object of this invention is, therefore, to provide means for arranging the parts of an oil level indicating device whereby the indicator is controlled directly from the level of the oil of the crank case.

Another object of the invention is to provide an oil level indicating device for crank cases of motor vehicle engines which may be installed without changing the crank case or other parts of the engine.

A further object of the invention is to provide an oil level indicating device of the crank case of a motor vehicle engine which is of a simple and economical construction.

With these and other objects and advantages in view the invention embodies an auxiliary cylinder connected to a crank case of an engine, a control cylinder positioned adjacent the auxiliary cylinder and having a piston therein, a rod of which is positioned to engage a float in the auxiliary cylinder, an indicator actuating cylinder having a magnet in a float therein connected by a tube to the control cylinder, a combination valve through which oil is supplied to and drains from the control cylinder and a pump for supplying oil to the valve and cylinder.

Other features and advantages of the invention will appear from the following description taken in connection with the drawings wherein.

Figure 1:
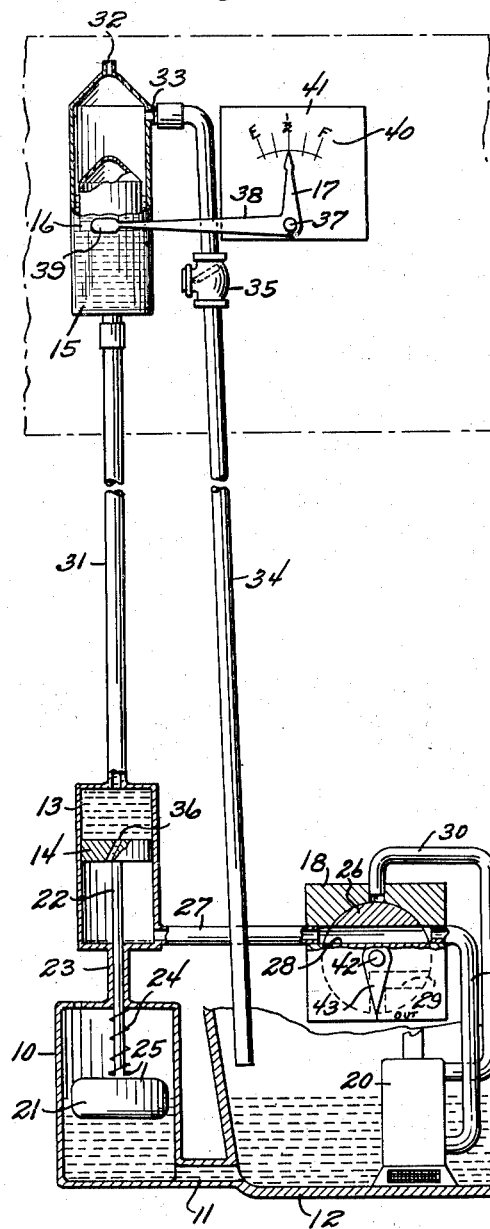
Figure 1 is an elevational view illustrating the control and auxiliary cylinders shown in combination with a crank case, valve and pump and showing the control cylinder connected to an indicating cylinder, parts of the said devices being broken away and other parts shown in section.

Referring now to the drawings wherein like reference characters denote corresponding parts the improved oil level indicator of this invention includes an auxiliary cylinder or container 10 which is connected by a tube 11 to a crank case 12, a control cylinder 13 having a piston 14 therein, an indicating cylinder 15 having a magnet 16 providing a float therein, a pointer 17 and a control valve 18 which is positioned in the discharge connection 19 of a pump 20.

With the auxiliary cylinder connected to the crank case, as illustrated in the drawings, the oil level in the auxiliary cylinder will be the same as that of the crank case and a float 21 positioned in the auxiliary cylinder will, therefore, follow the oil level of the crank case.

The piston 14 of the control cylinder 13 is provided with a piston rod 22 that extends through a sleeve 23 connecting the cylinder 13 to the cylinder 10 and a spring 24 positioned around the lower end of the piston rod 22, is retained in position by a pin 25 whereby, with the core 26 and the valve 18 in the position shown in Figure 1 the piston 14 is drawn downwardly by the spring 24 as oil drains from the lower end of the control cylinder. The lower end of the control cylinder is connected to the valve body 18 by a tube 27 and a passage 28 through the core 26 of the valve establishes communication between the tubes 27 and 19 with the core 26 turned to the position shown in Figure 1.

With the parts as illustrated in Figure 1 oil from the pump 20 is forced through the tube 19, the opening 28 in the valve core 26, and tube 27 into the control cylinder 13. In the design illustrated in Figure 2 the valve core 26 is turned through an angle of 180 degrees whereby the L-shape opening 29 is positioned to register with the tube 27 and also with a tube 30 whereby the oil flows from the cylinder 13 back into the crank case through the pump 20.

The control cylinder 13 is connected to the cylinder 15 by a tube 31 and the cylinder 15 is provided with a release opening 32 for relieving vacuum in the upper end of the cylinder, and also an overflow connection 33 connected by a tube 34 to the crank case 12. The tube 34 is provided with a check valve 35 to prevent oil being drawn back into the upper end of the indicator cylinder 15.

Figure 2:
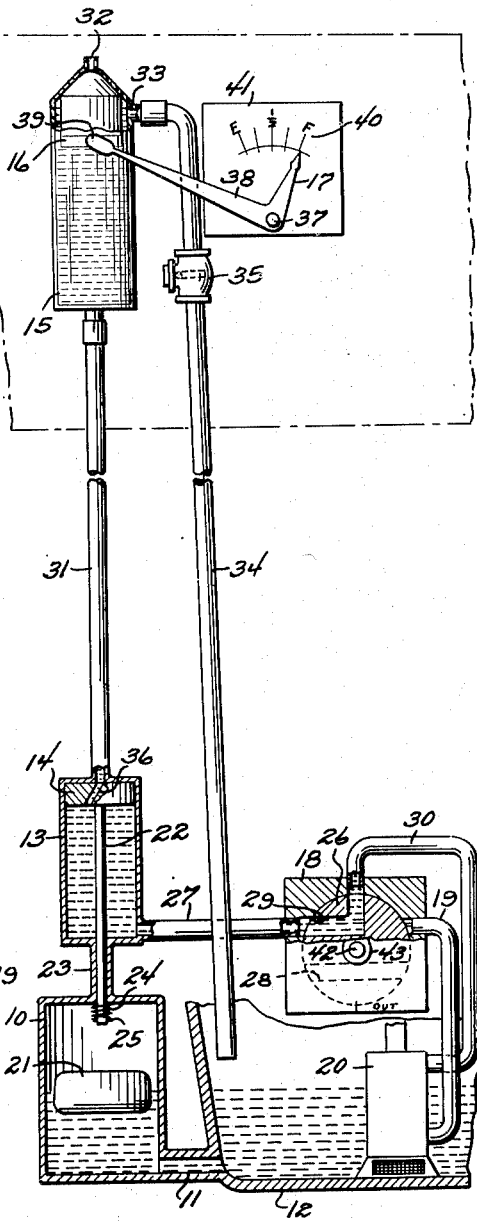
Figure 2 is a similar view showing the valve turned to the operative position wherein oil of the control cylinder is passing back into the crank case, permitting the piston and float having the magnet therein to drop for indicating the level of the oil.

The piston 14 is provided with a small opening 36 through which fluid passes upwardly through the piston to the cylinder 15 through the tube 31 with the piston in the upper position as shown in Figure 2.

The upper cylinder 15 is preferably formed of glass or other suitable transparent material and this cylinder may be positioned on the instrument board or panel, or the cylinder may be incorporated in the panel and the elevation of the oil determined by the pointer 17 which is pivotally mounted on a pin 37 and actuated by an arm 38, the outer end of which is provided with a metal element 39 that is positioned to follow the magnetic float 16 to indicate the position of the float in the cylinder. The pointer 17 is positioned to coact with the indicating dial 40 on a panel 41 which may be located at any suitable point in the vehicle.

It will be understood that the valve 18 may be provided with suitable mounting means and this valve may be located at one side of the engine or may be mounted at a convenient location. The valve may be provided with a stem 42 and a pointer 43 is provided on the end of the stem to indicate the positions of the openings 28 and 29 in the core thereof.

With the parts in the position as illustrated in Figure 1 the pump 20 is started whereby oil is pumped through the connections 19 and 27 and the valve 18 into the lower part of the cylinder 13. The oil forces the piston 14 upwardly in the position shown in Figure 2, drawing the lower end of the piston rod away from the float 21 which rests on the surface of the oil.

Upon continued operation of the pump 20 oil passes through the small opening 36 in the piston 14 whereby a small amount of oil passes upwardly through the tube 31 and into the transparent cylinder 15 in which the oil carries the float 16 upwardly to the position shown in Figure 2.

Upon closing the valve 18 to turn the core from the position shown in Figure 1 to that shown in Figure 2 the oil below the piston 14 is relieved whereby the oil passes back into the crank case and the piston 14 drops downwardly until the lower end engages the float 21 and in this movement the oil drops from the upper cylinder 15 into the upper part of the cylinder 13 to compensate for the displacement of the piston 14. The amount of oil required to fill the upper end of the cylinder 13 with the piston rod 22 engaging the float 21, causes the oil in the indicator cylinder or container 15 to lower. With the areas of the cylinders accurately determined the proportions or parts of oil in the lower end of the cylinder 15 and in the upper end of the cylinder 13, positions the float 16 to correspond with the oil level of the crank case whereby the level of the oil is indicated by the float 16 and also by the position of the pointer 17. The downward travel of the float 16 is limited by the position of the float 21 which rests upon the oil in the auxiliary cylinder 10 and the level of the oil in the cylinder 10 corresponds with that of the crank case.

It will be understood that modifications may be made in the design and arrangement of the parts without departing from the spirit of the invention.

What is claimed is:

1. An oil level indicator for a motor vehicle engine having a crank case comprising an auxiliary container connected to the crank case whereby the level of liquid in the auxiliary container corresponds to that of liquid in the crank case, a control cylinder positioned above the auxiliary container and connected thereto by a vertically disposed sleeve, a float in the said auxiliary container, a piston having an opening therethrough positioned in the control cylinder and having a piston rod integral therewith and extended through the said sleeve, said sleeve positioned whereby the said piston rod engages the float in the container, an indicator cylinder connected to the control cylinder by a tube, a float in the said indicator cylinder, a bypass connection from the said indicator cylinder to the crank case, a pump for forcing fluid from the crank case into the control cylinder, a connection from the pump to the said control cylinder, and a valve in the said connection.

2. An oil level indicator for a motor vehicle having an engine with a crank case comprising an auxiliary container connected to the crank case and positioned whereby the level of oil therein corresponds to the level of oil in the crank case, a float in the auxiliary container, a control cylinder positioned above the auxiliary container and connected thereto by a sleeve, a piston having an opening therethrough positioned in the control cylinder and having a piston rod extended through the said sleeve connecting the control cylinder to the auxiliary container, an indicator container connected by a tube to said control cylinder, a float in the said indicator container, a bypass connection extended from the upper end of the said indicator container to the crank case, a pump having a discharge tube extended through the control cylinder at a point below the piston therein, a manually actuated valve in said discharge connection of the pump, and means indicating the position of the float in the said indicator cylinder.

3. In an oil indicator for a motor vehicle engine having a crank case, the combination which comprises an auxiliary cylinder positioned adjacent a crank case and connected thereto, a float in the auxiliary cylinder, a control cylinder positioned above the auxiliary cylinder and connected thereto by a sleeve, a piston in the control cylinder and having a piston rod extended through the sleeve connecting the control cylinder to the auxiliary cylinder and extended to engage the float in the said auxiliary cylinder, a spring on the lower end of the piston rod, an indicating cylinder positioned at a remote point and connected to the control cylinder by a tube, an overflow connection extended from the upper end of the indicating cylinder to the crank case, a check valve in the said connection from the indicating cylinder to the crank case, a float in the said indicating cylinder, a pump positioned to receive fluid from the crank case, a connection from the discharge of the pump to the lower end of the control cylinder, a valve having a side connection therein positioned in the connection from the pump to the control cylinder, and a bypass connection from the said valve back to the said crank case.

4. An oil level indicator for a motor vehicle engine having a crank case comprising an auxiliary container connected to the crank case whereby the level of liquid in the auxiliary container corresponds to that of liquid in the crank case, a control cylinder positioned above the auxiliary container and connected thereto, a float in said auxiliary container, means for supplying oil from the crank case to said control cylinder, a manually actuated valve in said conveying means, an indicator container adapted to be positioned at a remote point and connected to the control cylinder with a tube, an overflow connection from the upper end of the indicator container to the crank case, and means in said control cylinder for contacting the float of the auxiliary container for retaining oil in the indicator container to indicate the oil level in the auxiliary container and crank case.

MAURICE BUTTS.

REFERENCES CITED

The following references are of record in the file of this patent:

UNITED STATES PATENTS

| Number | Name | Date |
|---|---|---|
| 1,264,218 | Steneck | Apr. 30, 1918 |
| 2,554,374 | Melas | May 22, 1951 |